United States Patent [19]
Butler

[11] 3,754,668
[45] Aug. 28, 1973

[54] POSITIVE MECHANICAL DRIVE FOR THE BALE SEPARATING HOOKS OF A SINGLE BALE UNLOADING BALE WAGON

[75] Inventor: Gene R. Butler, Kingsburg, Calif.

[73] Assignee: Sperry Rand Corporation, New Holland, Pa.

[22] Filed: June 12, 1972

[21] Appl. No.: 261,760

[52] U.S. Cl.............. 214/8.5 G, 214/6 B, 214/518
[51] Int. Cl......................... B65g 60/00, B65p 1/04
[58] Field of Search............... 214/6 B, 8.5 F, 8.5 G, 214/518, 519, 8.5 K, 8.5 SS

[56] References Cited
UNITED STATES PATENTS
3,502,230   3/1970   Grey et al. ........................... 214/6 B
3,664,519   5/1972   Grey................................... 214/6 B Primary Examiner—Albert J. Makay
Attorney—John C. Thompson et al.

[57] ABSTRACT

The present invention relates to a positive mechanical drive for cycling the bale separating hooks of a single bale unloading bale wagon between an up bale engaged position and a retracted non-engaged position. Generally, the positive mechanical drive comprises a single revolution clutch drivingly interconnected by a four bar linkage to a rockshaft carrying the bale separating hooks. The single revolution clutch is clutched and declutched by an actuating linkage that is responsive to the timed movement of a cross conveyor associated with a single bale unloading table mounted on the bale wagon.

14 Claims, 8 Drawing Figures

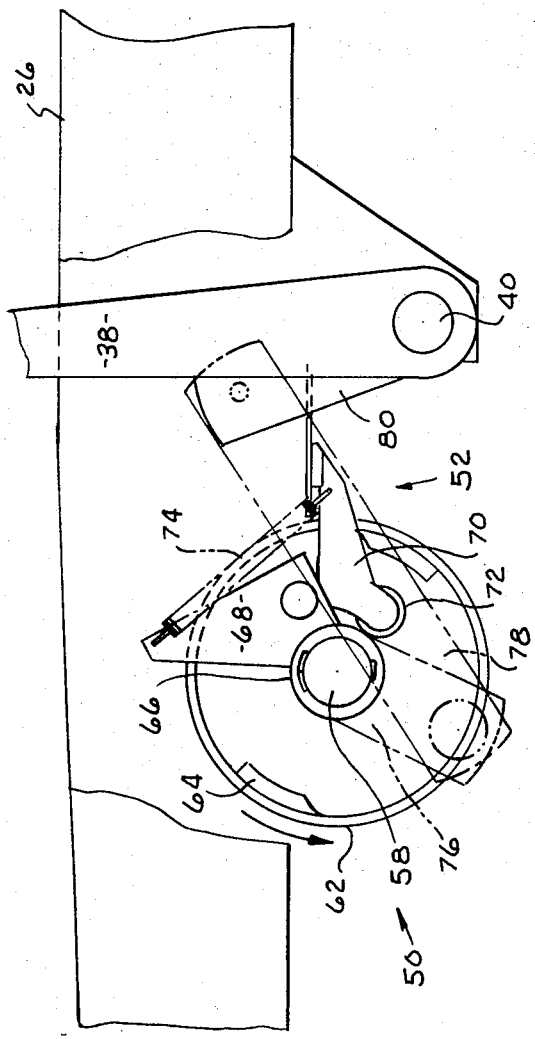
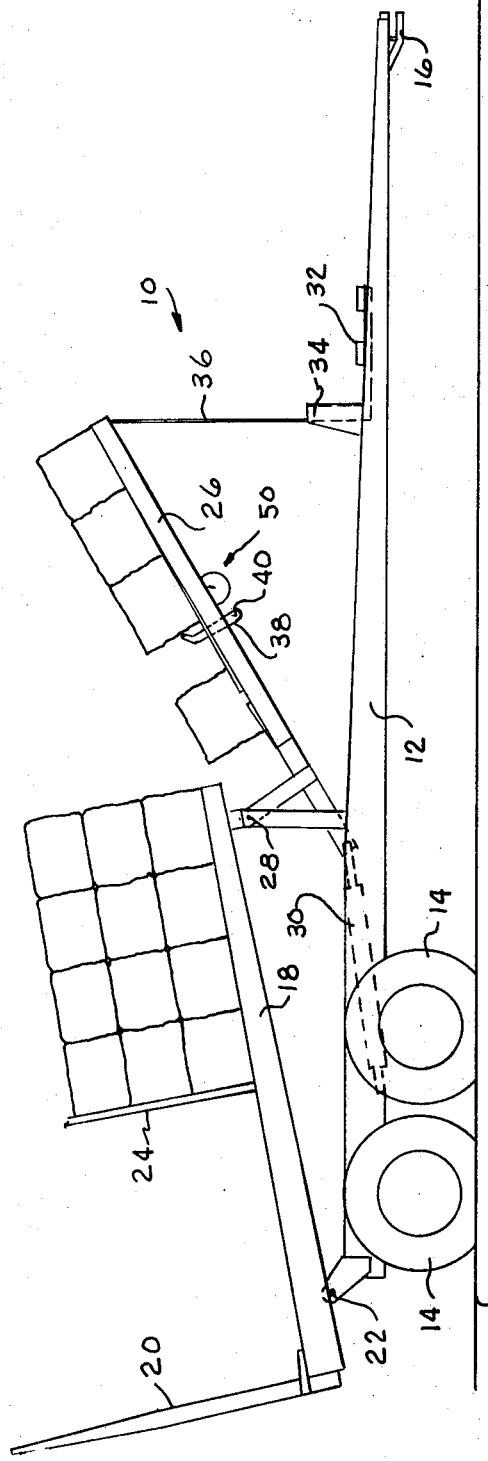

3,754,668

POSITIVE MECHANICAL DRIVE FOR THE BALE SEPARATING HOOKS OF A SINGLE BALE UNLOADING BALE WAGON

BACKGROUND OF THE INVENTION

The present invention relates to agricultural machinery and more particularly to bale wagons of the single bale unloading type which employ a series of bale separating hooks to separate a selected portion of a bale tier from another portion, whereby the other portion may be conveyed therefrom without interference from adjacent bales.

Most single bale unloading bale wagons of today operate on what may be termed the basic principle of tier separation. The basic principle of tier separation entails separating one or more layers of a tier from a single layer such that the single layer may be conveyed from the bale wagon without interference from adjacent bales.

To effectuate tier separation, single bale unloading bale wagons known today utilize a series of bale separating hooks disposed generally below the single bale unloading table of the bale wagon. During single bale unloading, the bale separating hooks normally cycle from an up bale engaged position, to a down retracted non-engaged position, and back up to the up bale engaged position. This complete cycle allows the bales resting on the inclined single bale unloading table to slide down where a lowermost layer overlies a transverse cross conveyor and after the bales have moved down the unloading table the upward movement of the bale separating hooks to the up position functions to separate another portion of the tier from the lowermost layer.

Thus, it becomes necessary in the design of a single bale unloading bale wagon to devise a drive means for periodically driving the bale separating hooks in timed relationship to the movement of the cross conveyor. One such drive system for the bale separating hooks is found in the disclosure of U. S. Pat. No. 3,502,230, granted to D. M. Grey et al. The D. M. Grey et al. disclosure shows a drive system for the bale separating hooks that is commonly referred to as a "shuttle system" wherein a lever arm is periodically engaged by the cross conveyor and carried therewith a certain distance, resulting in the hooks being raised to the up position. To maintain the hooks in the up position the same lever arm is stopped or arrested by a latch. After a momentary period of time the latch is caused to be released and because the lever arm is spring biased back towards its original starting position, the bale separating hooks are moved from the up bale engaging position to a retracted position generally beneath the single bale unloading table. Thus, it is apparent that the movement of the bale separating hooks from the up position to the retracted position depends on solely the spring biased lever arm which is clearly not a positive drive. Moreover, the shuttle system employed in the D. M. Grey et al. disclosure requires that the lever arm be returned to its original start position in order to be engaged by the shuttle carried by the cross conveyor. Therefore, if a bale of the lowermost layer overlying the cross conveyor becomes trapped, it follows that the bale separating hooks will not be able to return to the down retracted position and consequently the lever arm will not be able to return to its original starting point. Thus, the shuttle system becomes temporary inoperative and the single bale unloading operation must be temporary halted until the trapped bale can be removed from the single bale unloading table.

SUMMARY OF THE INVENTION

Applicant has devised a simple, reliable and relatively inexpensive positive mechanical drive for the bale separating hooks of a single bale unloading bale wagon. In particular, the present invention relates to the use of a single revolution clutch to drive the bale separating hooks in timed relationship to the transverse movement of a cross conveyor associated with the single bale unloading table. The single revolution clutch is driven by the same power source as the cross conveyor and is operative to cycle the bale separating hooks from an up bale gauge position, to a down retracting position, and back up to said up position, the cycling of the bale separating hooks being effectuated by a four bar linkage interconnecting the single revolution clutch and a rockshaft which carries the bale separating hooks.

It is therefore the principle object of the present invention to provide a simple, reliable, and relatively inexpensive drive for the bale separating hooks of a single bale unloading bale wagon.

Another object of the present invention resides in the provision of a positive independent drive for the bale separating hooks of a single bale unloading bale wagon which does not depend directly on the power associated with the movement cross conveyor to actuate the bale separating hooks.

A further object of the present invention resides in the provision of a four-bag linkage interconnected between the single revolution clutch of the present invention and the bale separating hooks, the four bar linkage including a crank arm or link driven by said single revolution clutch and interconnected by a connecting link to a rocker arm or link fixed to a transverse rockshaft having said bale separating hooks axially secured thereon.

Other objects and advantages of the present invention will become apparent and obvious from a study of the following escription and the accompanying drawings which are merely illustrative of the present invention.

BRIEF DESCRIPTION OF THE DRAWINGS

FIG. is a side elevational view of a single bale unloading bale wagon drawn in accordance with the present invention and having the single bale unloading table thereof disposed at an incline for single bale unloading.

FIG. 2 is a fragmentary side elevational view of the single revolution clutch and four bar linkage presented by the present invention to cycle the bale separating hooks from an up bale engaged position, to a retracted non-engaged position, and back to said up position.

DESCRIPTION OF THE PREFERRED EMBODIMENT

Figure 4:
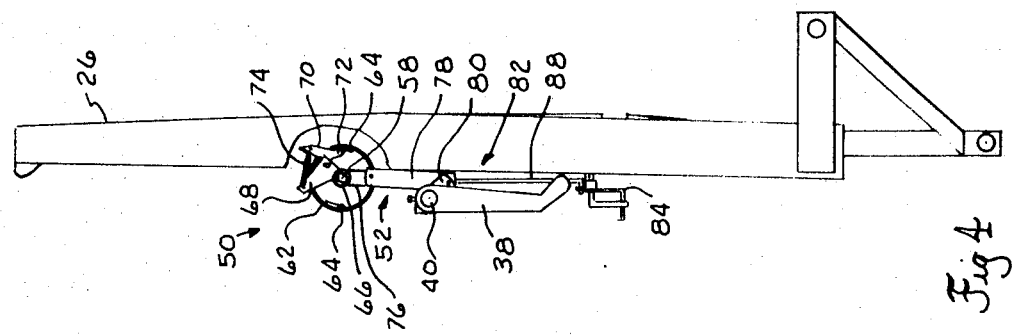
FIG. 4 is a side elevational view of the same single bale unloading table shown in FIG. 3.

With reference to the drawings, particularly FIG. 1, a bale wagon of the single bale unloading type is shown therein and indicated generally by the numeral 10. The bale wagon 10 comprises a generally fore-and-aft extending chassis structure 12 having a pair of rear wheels 14 rotatively mounted on each side thereof, the wheels serving to support said chassis as the bale wagon traverses the ground G. Mounted to the front of the chassis structure 12 is a clevis 16 which is adapted to be attached to the drawbar of a tractor, not shown, in order that the bale wagon may be towed thereby.

A generally flat load bed or load rack 18 is disposed above said chassis 12 and may be pivotally mounted thereto about a transverse axis 22. (Alternatively, the load bed may be fixed directly to the chassis.) The load bed 18 further includes a plurality of laterally spaced upstanding fingers 20 fixed to the rear end thereof, and a rolling rack 24 which may be of any conventional design that allows the rolling rack to move fore-and-aft along the load bed.

Pivotally mounted about transverse axis 28 just forwardly of the load bed 18 is a single bale unloading table 26, the single bale unloading table being operative to receive bales to form tiers thereon during the loading operation and further operative to serve as a single bale unloading table during the single bale unloading operation. To pivot the single bale unloading table 26, a conventional hydraulic cylinder 30 is anchored to the bale wagon's chassis structure 12 and extends therefrom where the rod end thereof is connected to a rear portion of the single bale unloading table. It will be observed from FIG. 1 that the single bale unloading table is supported by a prop 36 at an inclined angle relative to the chassis. The inclining of the second table 26 for single bale unloading is quite conventional, and as will become apparent from the subsequent discussion, the inclined single bale unloading table allows the bales thereon to freely slide down the table during the operation that separates a portion of the tier disposed thereon from another portion.

Disposed forwardly of the single bale unloading table 26 is a receiving or first table 32 which is pivotally mounted about axis 34 and is particularly adapted to receive bales from an offset pickup, not shown, and to successively convey layers or rows of bales to table 26 to form tiers thereon during the loading operation. Since the present invention deals with single bale unloading and since the receiving table does not play a part therein a detailed discussion of its structure and operation during the loading operation is not presented herein.

Figure 3:
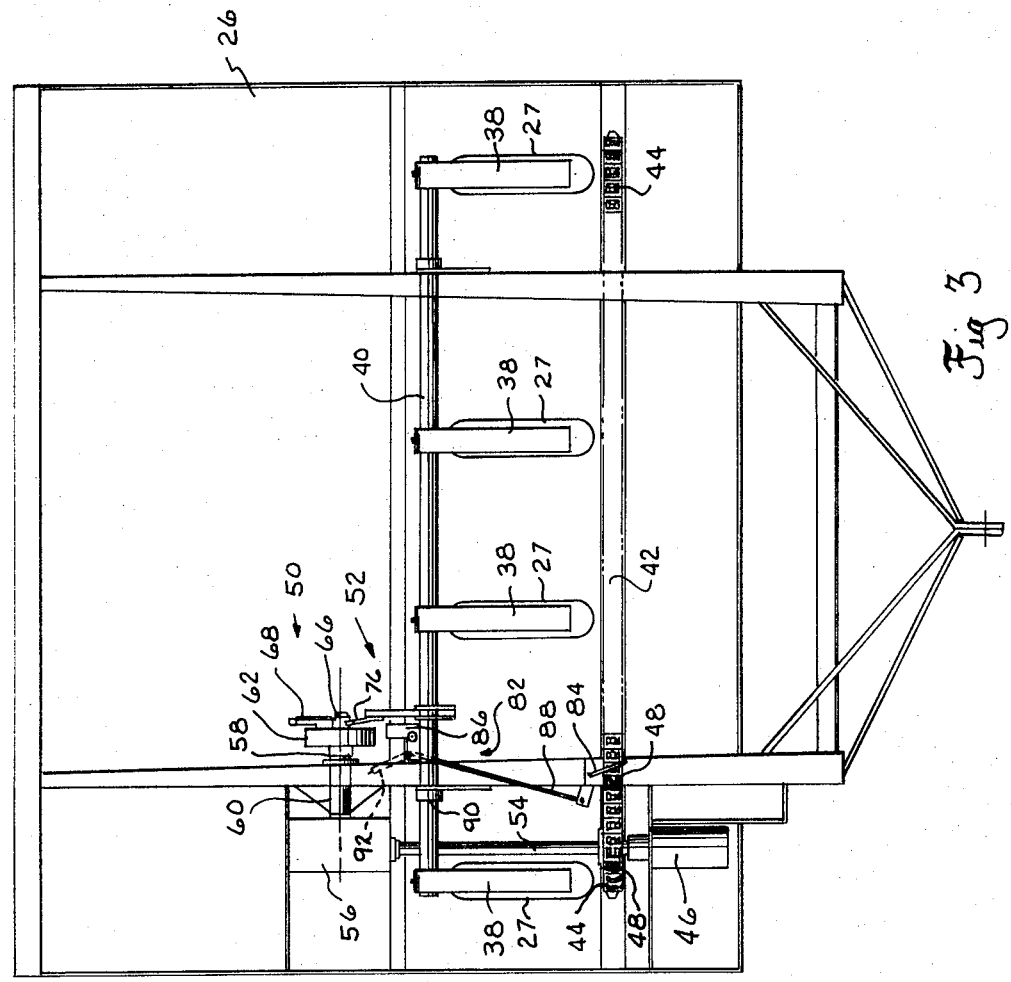
FIG. 3 is a plan view of the underside of aid single bale unloading table, showing particularly the single revolution clutch and means for actuating the same during single bale unloading operation.

With particular reference to FIG. 3, it is observed that a plurality of bale separating hooks 38 are secured to a transverse rockshaft 40 in axially spaced apart relationship. The bale separating hooks 38 are transversely aligned and adapted to move from a retracted non-engaged position (FIGS. 3 and 4) through a series of laterally spaced openings 27 formed within the single bale unloading table 26 to an up bale engaged position shown in FIG. 2. As pointed out previously and particularly discussed in the D. M. Grey et al. (U.S. Pat. 3,502,230) the bale separating hooks 38 principally function to separate one or more layers of a tier from a single layer, such that the single layer may be readily conveyed from the unloading table 26 without interference from adjacent bales. To convey the single layer from the unloading table 26, the present disclosure provides a transverse cross conveyor 42 trained around a pair of laterally spaced sprockets 44, the sprockets being rotatively mounted within the unloading table 26. As best seen in FIG. 3, the cross conveyor 42 includes tripping means 48, which as will be discussed subsequently cooperate with an actuating linkage structure to actuate the single revolution clutch of the present invention.

To power the cross conveyor 42 a hydraulic orbit motor 46 is provided and, as shown in FIG. 3, is operative to drive the left hand sprocket 44. The control valve and actuating linkage for the hydraulic orbit motor is not shown or discussed in the present application as such is deemed not material to the present invention. But for a discussion of such a control system one is once again referred to the disclosure of D. M. Grey et al., U. S. Pat. No. 3,502,230.

Generally, the basic drive system for the bale separating hooks of the present invention comprises a mechanical clutching mechanism indicated generally by the numeral 50 and a four bar linkage 52 interconnecting said mechanical clutching mechanism 50 with the rockshaft 40 of the bale separating hooks 38. In particular, the mechanical clutching mechanism 50 is driven by the same power source as that of the cross conveyor 42, namely the hydraulic orbit motor 46. Viewing this drive system in detail, it will be observed particularly from FIG. 3 that a drive shaft 54, which is operatively driven by the hydraulic orbit motor 46, drives a clutch shaft 58 through a conventional right angle gearbox 56. The clutch shaft 58 is rotatively journalled within a sleeve 60 and has fixed thereon driving means in the form of a clutch housing 62. As particularly seen in FIG. 2, the clutch housing includes four circumferentially spaced stops 64, the stops being spaced approximately 90 degrees apart. Rotatively mounted on the clutch shaft 58 adjacent the clutch housing 62 and in coaxial relationship thereto is driven means in the form of a driven hub 66. It should be emphasized that the driven hub 66 is not keyed to the clutch shaft 58 but is simply journalled for rotation thereon. The driven hub includes a paw bracket 68 secured thereto and having pawl 70 pivotally mounted thereto. Pawl 70 includes a roller 72 rotatively mounted thereto and particularly adapted to engage any of the stops 64 circumferentially disposed within housing 62. The pawl 70 is spring biased to an outer position by a spring 74 interconnecting the pawl brackets 68 and the paw itself. In the outer position the roller 72 will engage a respective stop 64 formed within the housing 62 and remain engaged therewith such that the driven hub 66 is rotated in unison with the clutch housing 62 which during single bale unloading is constantly driven.

As previously pointed out, the single revolution clutch 50 is operative to drive the bale separating hooks 38 through a four bar linkage indicated generally by the numeral 52. Viewing the four bar linkage in detail it will be observed that a crank arm or link 76 is fixed to the driven hub 66 and rotatable therewith. Crank arm 76 is operative to drive a rocker arm or link 80 which is fixed to transverse rockshaft 40, the crank arm being operatively connected thereto by a connecting link 78 that is pivotally connected at each end to the crank arm and rocker arm respectively. Thus, from FIGS. 5-8 it is apparent that in a complete cycle of the driven hub 66 that the bale separating hooks 38 are driven through a cycle by the four linkage 52. And it is further appreciated that the driven hub 66 is only operative to drive the bale separating hooks 38 when the pawl 70 is engaged with a respective stop formed within the clutch housing 62.

Therefore it becomes apparent that to drive the bale separating hooks the pawl 70 must be allowed to engage the stops 64 of the clutch housing 62. Conversely, to stop the bale separating hooks and to maintain them in a static state, the pawl 70 must be engaged and held away from the same stops ormed within the clutch housing 62. To actuate and deactuate the mechanical clutching mechanism 50, the present disclosure utilizes a clutch actuating means, indicated generally by the numeral 82, which is responsive to the timed movement of the cross conveyor 42 to clutch and declutch the clutching mechanism 50. In particular, the clutch actuating mechanism 82 comprises a trip arm 84, as best seen in FIGS. 3 and 4, disposed adjacent the cross conveyor 42 and aligned for engagement with the tripping means 48 carried thereby. The trip arm 84 is operative to actuate a bell crank 86 via an interconnecting link 88. Bell crank 86 is pivotally mounted and normally disposed such that it lies in the path of the pawl 70 and normally engages the paw as best seen in FIG. 2 and maintains the roller 72 thereof in an inward position out of engagement with the stops 64 of a clutch housing 62. When the trip arm 84 is engaged with the tripping means 48 of the cross conveyor, the bell crank 86 is pivoted counterclockwise, as viewed in FIG. 3, such that the bell crank no longer engages the pawl 70 and the latter is free to move outwardly therefrom for engagement with the stops 64. A spring 92 interconnecting the interconnecting link 88 and the single bale unloading table 26 normally biases the actuating means back to the normal position where the bell crank assumes a position in the path of the pawl. The tripping means 48 is spaced relatively close together such that the bell crank is only momentarily disposed out of the path of the pawl and has returned to the normal paw engaged position (FIG. 3) before the pawl has made a complete cycle. Therefore, when the paw has completed one cycle it again engages the bell crank and the roller is moved to the inward position, as shown in FIG. 2, consequently arresting the bale separating hooks 38 in an up bale engaged position.

Figure 5:
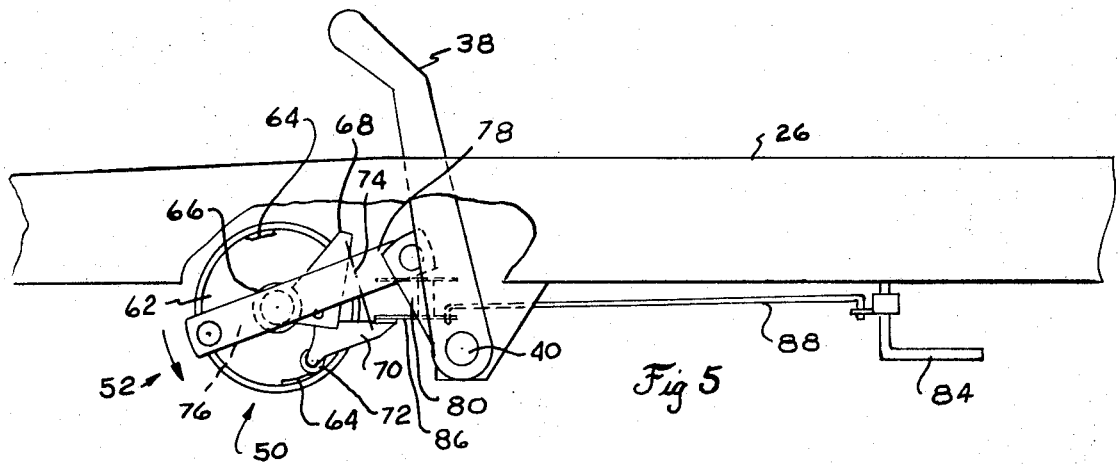
FIGS. 5-8 are a sequence of views showing the relationship of the single revolution clutch and associated four bar linkage relative to various positions of the bale separating hooks during the complete cycle thereof.
Figure 6:
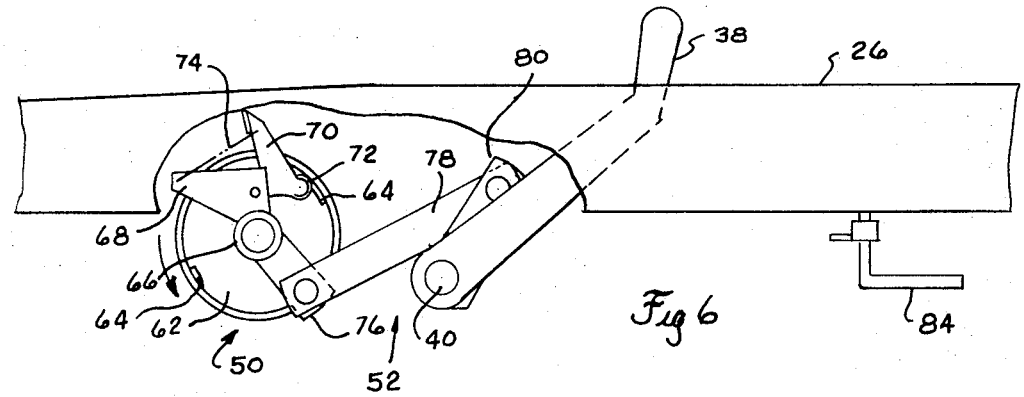

As already discussed, in the single bale unloading operation the principle cycle of the bale separating hooks entails the movement of the hooks from an up bale engaged position, to a down retracted non-engaged position below the single bale unloading table, and back up to said up position where the bale separating hooks engage a portion of the tier disposed on the unloading table. Therefore, in the up position, as shown in FIGS. 2 and 5, the weight of the tier being supported by the bale separating hooks would tend to force the hooks back to the down position. But the engagement of the bell crank 86 and the pawl 70 acts to prohibit downward movement of the hooks 38. In order for the bale separating hooks to move down it is necessary for the driven hub 66 and the pawl to turn counterclockwise, as viewed in FIGS. 2 and 5. Such counterclockwise movement is prohibited by the engagement of the bell crank 86 by the pawl 70 and consequently the hooks are not free to move downward as long as the bell crank 86 is in the normal engaged position as shown in FIGS. 2 and 3. Moreover, because the four bar linkage is over center when the bale separating hooks 38 are in the up position the crank arm 76 is prohibited from turning clockwise, as viewed in FIGS. 2 and 5.

Figure 7:
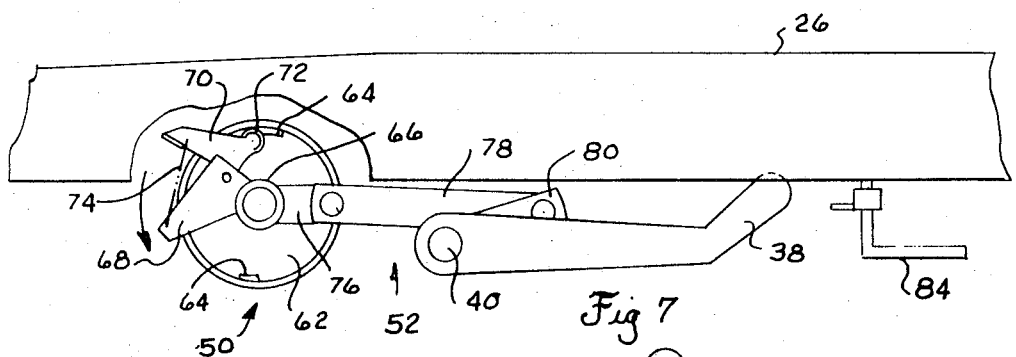
Figure 8:
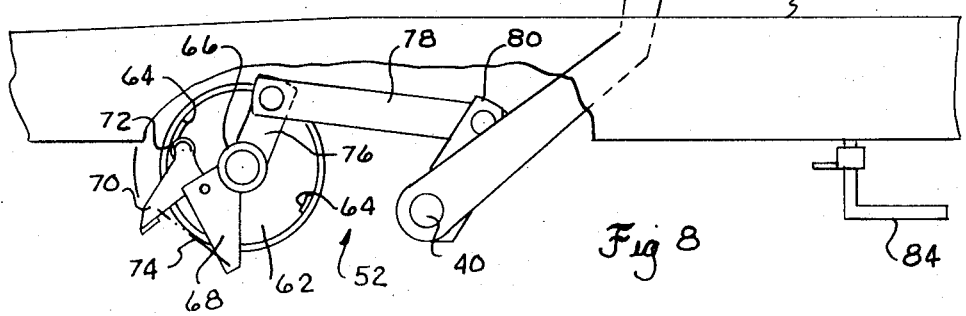

FIGS. 5-8 are a series of sequence views showing the bale separating hooks cycling from the up position, to the down position, and back up to the up position. To start the cycle the trip arm 84 disposed adjacent the cross conveyor 42 is tripped by jhe tripping means 48 associated with the cross conveyor. The the of the trip arm 84 results in the bell crank 86 being pivoted out of engagement with the pawls 70, causing the pawl to engage a respective stop 64 formed within the clutch housing 62. The engagement of the pawls 70 with a respective stop 64 results in the driven hub 66 being rotated counterclockwise in unison with the clutch housing 62. Because the single bale unloading table 26 is disposed at an incline during the single bale unloading operation as shown in FIG. 1, and not horizontal as shown in FIGS. 5 through 8, the weight of the bale separating hooks tends to cause them to fall down to the retracted position under the influence of gravity. Thus, the bale separating hooks 38 tend to free fall from the up position to the down retracted position as shown in FIG. 7. Although not particularly illustrated in the drawings, the free falling of the hooks may be limited by the engagement of the roller 72 with a preceding stop 64 formed within the housing 62. In such a case it would follow that the pawl 70 would precede the respective driving stop by approximately one quarter revolution since there are four equally spaced stops. It should be emphasized, however, that if for any reason the bale separating hooks do not free fall then the engagement of the roller 72 with the respective driving stop will positively drive the bale separating hooks to the down position. But in practice the bale separating hooks do fall in advance of a respective stop and has the effect of causing the bale separating hooks to remain static for a very short period of time once they reach the down position. This is quite advantageous in that it assures that the tier disposed on the single bale unloading table 26 has had the necessary time to move down the table before the hooks being their upward movement. After the bale separating hooks have reached the downward position (FIG. 7) the respective driving stop 64 catches up with the roller 72 of the pawl and drives the driven hub and crank arm 76 upwardly, as shown in FIG. 8, and thereby causing the bale separating hooks to move towards their up position. Once the bale separating hooks reach the up position, the bell crank 86 has returned to its normal pawl engaging position and the paw is thereby engaged and the driven hub 66 is clutched, bringing the bale separating hooks 38 to a halt. And, as pointed out above, the presence of the engagement of the bell crank 86 and pawl 70 assures that the bale separating hooks do not fall until the appropriate time as dictated by the cross conveyor 42.

The terms, "upper" "lower," "forward," "rearward" etc. have been used herein merely for the convenience of the foregoing specification and in the appended claims to describe the positive mechanical drive for the bale separating hooks of a single bale unloading bale wagon and its parts as oriented in the drawings. It is to be understood, however, that these terms are in no way limiting to the invention since the positive mechanical drive for the bale separating hooks of a single bale unloading bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes cominng within the meaning and equivalency range are intended to be embrached herein.

Having thus described my invention, what I claim is:

1. In a single bale unloading bale wagon having a wheel supported chassis, a load bed mounted on said chassis, a single bale unloading table mounted adjacent said load bed, a plurality of bale separating hooks moveably mounted adjacent said single bale unloading table, a cross conveyor associated with said single bale unloading table and adapted to move relative thereto for conveying bales therefrom, a control and drive system for actuating said bale separating hooks in time relationship to the movement of said cross conveyor, comprising:
   a. a mechanical clutching mechanism,
   b. means for driving said mechanical clutching mechanism,
   c. actuating means for clutching and declutching said mechanical clutching mechanism in time relationship to the movement of said cross conveyors, and
   d. linkage means operatively interconnecting said mechanical clutching mechanism with said bale separating hooks for driving said hooks in response to the selective actuation of said mechanical clutching mechanism.

2. A single bale unloading bale wagon, as recited in claim 1, wherein said mechanical clutching mechanism comprises a single revolution clutch.

3. A single bale unloading bale wagon, as recited in claim 2, wherein said linkage means operatively interconnecting said mechanical clutching mechanism with said bale separating hooks comprises a four bar linkage.

4. A single bale unloading bale wagon, as recited in claim 3, wherein said four bar linkage comprises: a crank arm driven by said single revolution clutch, a rocker link operatively connected to said bale separating hooks, and a connecting link interconnecting said crank arm with said rocker link for transferring the motion of said crank arm to said rocker link.

5. A single bale unloading bale wagon, as recited in claim 2 wherein said single revolution clutch comprises:
   a. a housing operatively connected to said clutch driving means;
   b. stop means carried by said housing;
   c. a driven hub rotatively mounted adjacent said clutch housings;
   d. a pawl carried by said driven hub and selectively engageable with said stop means of said housing for driving said hub;
and wherein said bale separating hooks are secured to a transverse rockshaft in axially spaced apart relationship, and wherein said linkage means interconnecting said mechanical clutching mechanism with said bale separating hooks includes a four bar linkage, comprising:
   e. a crank arm fixed to said driven hub and rotatable therewith;
   f. a rocker link fixed to said transverse rockshaft having said bale separating hooks secured thereon; and
   g. a connecting link connecting said crank arm with said rocker link whereby said driven hub is effective to cycle said crank arm which results in the rocker link actuating said transverse shaft and the bale separating hooks secured thereon.

6. A single bale unloading bale wagon as recited in claim 5 wherein said actuating means includes a stop normally operative to engage said pawl and maintain said pawl in a non-engaged position relative to said stop means carried by said clutch housing such that said driven hub remains relatively stationary.

7. A single bale unloading bale wagon, as recited in claim 6, wherein said actuating means includes an actuating link operatively connected to said stop and responsive to the timed movement of said cross conveyor for disengaging said stop from said pawl, whereby said paw may engage said stop means carried by said clutch housing and cause said driven hub to rotate, thereby driving said four bar linkage and causing said bale separating hooks to be actuated.

8. A single bale unloading bale wagon, as recited in claim 7, wherein said actuating means further includes a trip arm mounted adjacent said cross conveyor and connected to said actuating link, and wherein said stop comprises a bell crank pivotally mounted and particularly disposed for selective engagement with said pawl; and wherein said cross conveyor is provided with tripping means adapted to engage said trip arm and consequently actuate said bell crank.

9. In a single bale unloading bale wagon of the type having a wheel supported chassis, a load bed mounted on said chassis, a single bale unloading table mounted adjacent said load bed, a rockshaft rotatively journalled beneath said single bale unloading table, bale separating hooks secured in axial spaced apart relationship to said rockshaft and operative to cycle back and forth through openings formed within said single bale unloading table for engaging and disengaging overlying bales, a cross conveyor associated with said single bale unloading table for conveying bales therefrom, drive means for driving said cross conveyor, and a positive mechanical drive and control system for cycling said bale separating hooks between an up bale engaged position and a retracted non-engaged position, comprising:
   a. a mechanical clutching mechanism including rotary driving means, rotary driven means and interconnecting means for selectively drivingly interconnecting said driving and driven means;
   b. linkage means interconnecting said driven means with said rockshaft;
   c. means for driving said rotary driving means of said mechanical clutching mechanism; and
   d. actuating means responsive to timed movement of said cross conveyor for selectively actuating said interconnecting means of said mechanical clutching mechanism such that driving torque applied to said rotary driving means is transferred to said rotary driven means, whereby said rockshaft and bale separating hooks are actuated via said linkage means.

10. A single bale unloading bale wagon, as recited in claim 9, wherein said linkage means interconnecting said driven means with said rockshaft includes a four bar linkage.

11. A single bale unloading bale wagon, as recited in claim 10, wherein said four bar linkage comprises: a crank arm carried by said driven means, a rocker link fixed to said rockshaft, and a connecting link pivotally interconnected between said crank and said rocker link.

12. A single bale unloading bale wagon, as recited in claim 9, wherein said driving means of said mechanical clutching mechanism includes a housing having at least one circumferentially disposed stop formed therein, and wherein said interconnecting means of said mechanical clutching mechanism comprises a pawl carried by said driven means and biased outwardly for engagement with said stop formed within the housing of said driving means, whereby the driving torque applied to said driving means may readily be transferred to said driven means.

13. A single bale unloading bale wagon, as recited in claim 12, wherein said actuating means includes a stop particularly disposed to normally engage and maintain said pawl inwardly out of engagement with the stop formed within said housing, thereby clutching the mechanical clutching mechanism and disrupting the drive between said driving and driven means, said stop of said actuating means being further operative to disengage said pawl in response to the timed movement of said cross conveyor whereby said pawl may engage the stop formed within the housing of said driving means and driving torque may be readily transferred between said driving and driven means.

14. A bale wagon having a positive mechanical drive system for the bale separating hooks thereof, comprising in combination:
   a. a wheel supported chassis;
   b. a load bed mounted on said chassis;
   c. a single bale unloading table mounted adjacent said load bed and having laterally spaced openings formed therein;
   d. a plurality of bale separating hooks axially spaced along a rockshaft journalled beneath said single bale unloading table, said bale separating hooks being operative to cycle between an up bale engaged position to a retracting non-engaged position;
   e. a transversely disposed cross conveyor associated with said single bale unloading table and including tripping means thereon;
   f. driving means for driving said cross conveyor;
   g. a single revolution clutch assembly drivingly interconnected to said driving means, said single revolution clutch assembly including:
      1. a clutch housing drivingly interconnected to said conveyor driving means and having at least one stop circumferentially disposed therein,
      2. a coaxially driven hub rotatively mounted adjacent said clutch housing, nd
      3. a pawl carried by said driven hub and biased for selective engagement with said stop formed within said housing;
   h. a four bar linkage interconnecting said single revolution clutch and said rockshaft for actuating said rockshaft and bale separating hooks in response to the selected actuation of said single revolution clutch, said four bar linkage comprising:
      1. a crank carried by said driven hub,
      2. a rocker link fixed to said rockshaft, and
      3. a connecting link interconnecting said crank and rocker whereby the cycling of said crank arm results in the rocker link being moved back and forth; and
   i. actuating means responsive to the tine movement of said cross conveyor for actuating said single revolution clutch and consequently said bales separating hooks, said actuating means including:
      1. stop means disposed adjacent said single revolution clutch and particularly disposed and biased to normally engage said pawl and hold it inwardly out of engagement with the stop formed within said housing:
      2. a trip arm disposed adjacent said cross conveyor and aligned for engagement with the tripping means of said cross conveyor; and
      3. an interconnecting link operative to momentarily disengage said stop means for said pawl in response to engagement of said trip arm by said tripping means, whereby said pawl engages the stop formed within said housing and driving torque of said housing is transferred to said driven hub which acts to cycle said bale separating hooks between said up and retracted position in a single revolution of said driven hub, and whereby said stop means is operative to again quickly assume a position in the path of said pawls such that said pawl is held inwardly after a single revolution such that driving torque is again disrupted between said housing and said driven hub.

* * * * *